No. 677,573. Patented July 2, 1901.
E. HUBER.
FRICTION CLUTCH.
(Application filed Apr. 4, 1901.)
(No Model.) 2 Sheets—Sheet 1.
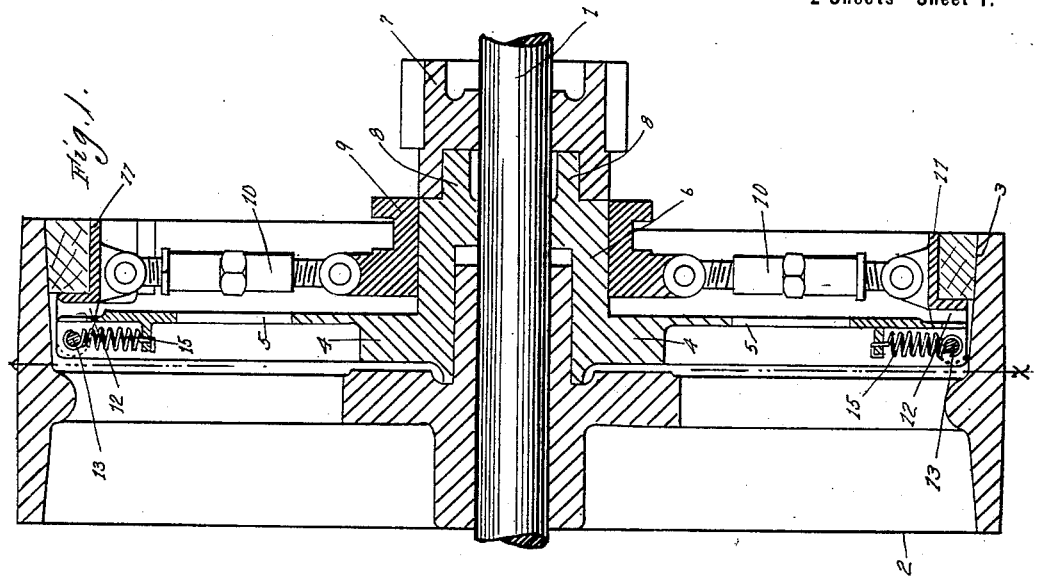
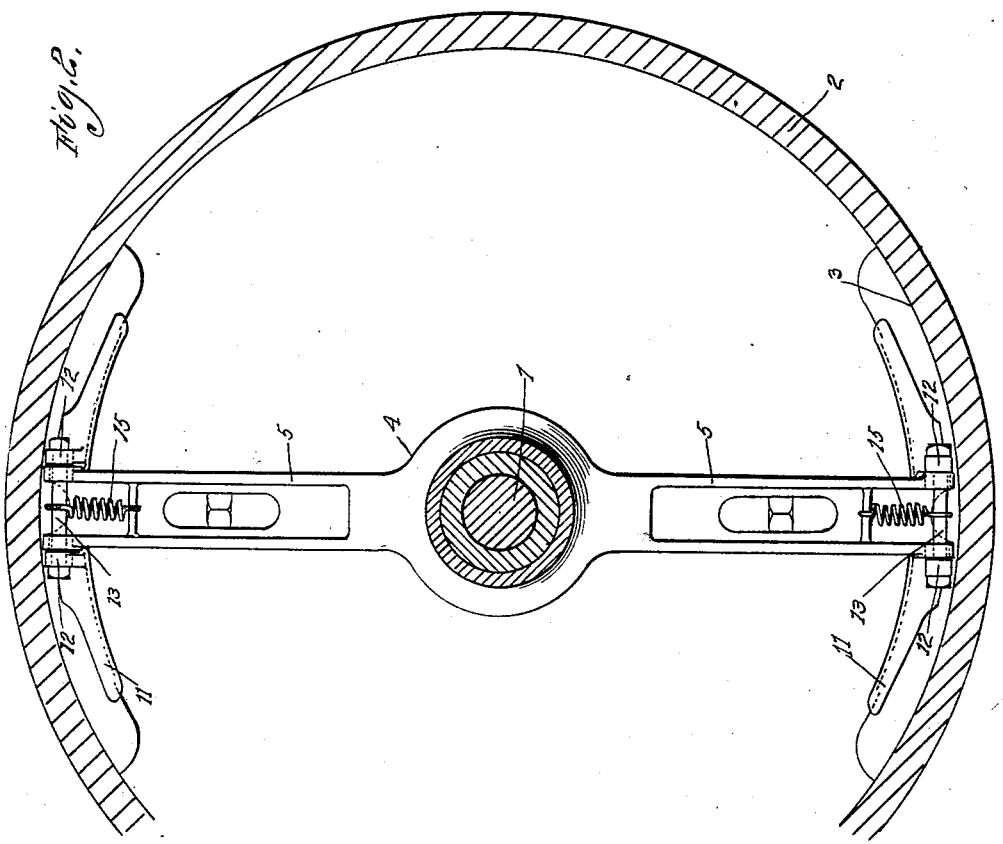
WITNESSES. INVENTOR,
Wm. O'Laughlin Edward Huber
F. W. Schaefer. By H. A. Toulmin.
ATTORNEY.
THE NORRIS PETERS CO., PHOTO-LITHO., WASHINGTON, D. C.

No. 677,573. Patented July 2, 1901.
E. HUBER.
FRICTION CLUTCH.
(Application filed Apr. 4, 1901.)
(No Model.) 2 Sheets—Sheet 2.
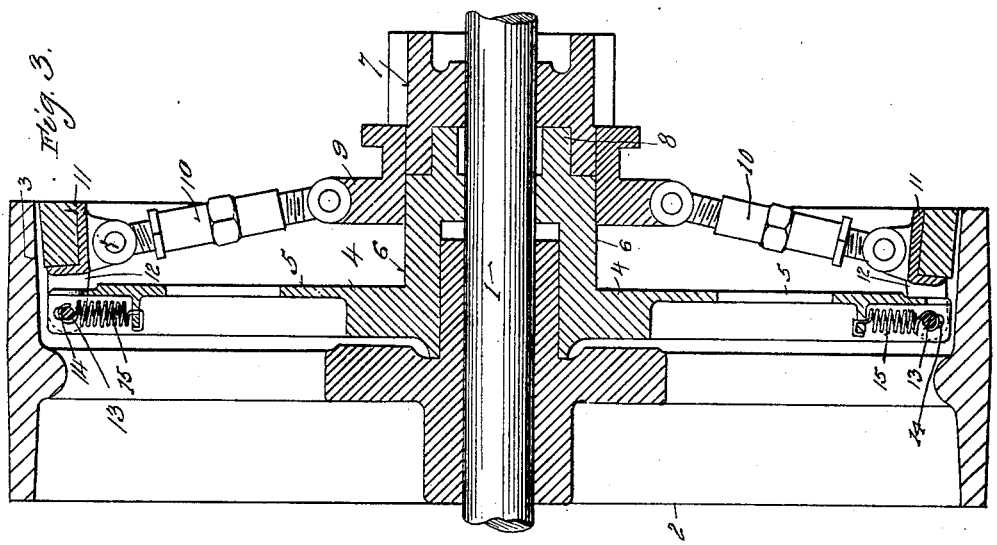
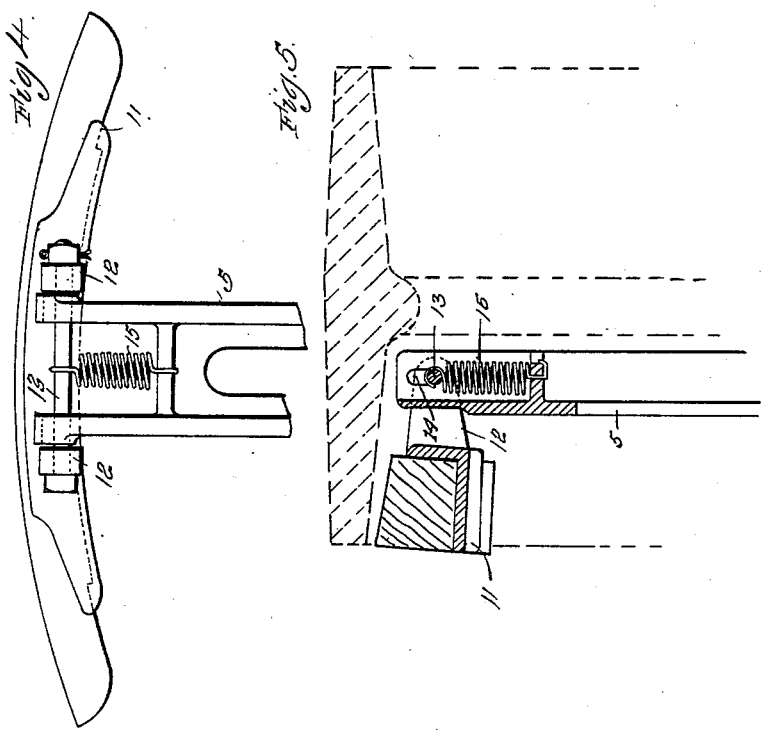
WITNESSES:
Wm O'Laughlin
F. W. Schaefer.
INVENTOR
Edward Huber
By H. A. Toulmin.
ATTORNEY.
THE NORRIS PETERS CO., PHOTO-LITHO., WASHINGTON, D. C.

UNITED STATES PATENT OFFICE.

EDWARD HUBER, OF MARION, OHIO.

FRICTION-CLUTCH.

SPECIFICATION forming part of Letters Patent No. 677,573, dated July 2, 1901.

Application filed April 4, 1901. Serial No. 54,256. (No model.)

*To all whom it may concern:*

Be it known that I, EDWARD HUBER, a citizen of the United States, residing at Marion, in the county of Marion and State of Ohio, have invented certain new and useful Improvements in Friction-Clutches, of which the following is a specification, reference being had therein to the accompanying drawings.

This invention relates to friction-clutches, and has for its object to provide a simple and efficient construction whereby the friction-shoes may be readily engaged with and disengaged from the coöperating friction-surface, the engagement and disengagement being gradual.

To these and other ends the invention consists in certain novel features, which I will now proceed to describe and will then particularly point out in the claims.

In the accompanying drawings, Figure 1 is a sectional view taken in a plane passing through the axis of revolution of the clutch and showing the parts in engagement. Fig. 2 is a sectional view taken on the line *x x* of Fig. 1. Fig. 3 is a view similar to Fig. 1, showing the parts disengaged. Fig. 4 is an enlarged detail view of a portion of Fig. 2, and Fig. 5 is an enlarged detail sectional view.

In the accompanying drawings I have shown my invention as embodied in a clutch of a type well known and in common use in connection with traction-engines also employed for driving machinery, and in said drawings 1 indicates a driven shaft, and 2 a pulley-wheel secured thereon and provided with an annular friction-surface 3, with which the clutch-shoes engage.

4 indicates a spider provided with radial arms 5 and a hub 6, which is loose with respect to the shaft and pulley-wheel and which is in engagement with a loose pinion 7 by means of lugs 8 or in any other suitable manner.

9 indicates a collar sliding on the hub 6 of the spider and rotating along with the same, said collar being grooved to receive an operating-lever, whereby it may be moved longitudinally relatively to the shaft in the usual manner, and having pivoted to it the toggle-arms 10. The clutch-shoes are indicated at 11, each shoe being provided with arms or lugs 12, extending laterally from the shoe and adapted to receive a pivot-bolt 13. Each spider-arm 5 is longitudinally slotted in a radial direction, as indicated at 14, to receive the pivot-bolt 13. In the construction shown, which is that which I prefer, the upper end of each arm 5 is bifurcated, each end being slotted, as described, and the two ends of each arm fitting between the lugs 12, as clearly shown in Fig. 4. Each arm 5 is provided with a spring 15, one end of which is secured to said arm, while the other end is secured to the pivot-bolt of the corresponding clutch-shoe and serves to draw said pivot and the shoe inward toward the shaft. It will be understood, of course, that each clutch-shoe has pivoted to it one of the toggle-arms 10.

It will be observed that the springs act to draw the clutch-shoes inward toward the shaft and out of engagement with the friction-pulley, holding the pivots 13 at the inner ends of the slots 14. When the clutch is disengaged, the position of the parts is that shown in Figs. 3 and 4 of the drawings, with the pivots 13 at the inner ends of the slots 14. When the collar 9 is so moved as to cause engagement of the clutch parts, the clutch-shoes will first move upward at their outer or free ends, and when these portions of the shoes come into engagement with the surface of the friction-pulley further movement of the collar 9 will gradually move the pivots 13 upward or outward along the slots 14, causing a progressive engagement of more and more of the surface of each clutch-shoe until the shoes are in full engagement, as shown in Figs. 1 and 2. Upon moving the collar 9 in the opposite direction a gradual disengagement follows, the inner portions of the clutch-shoes being first disengaged by the action of the springs 15 and full disengagement occurring after the pivots 13 have reached the inner ends of the slots 14.

It is obvious that my invention may be embodied in structures other than that chosen for purposes of illustration. Either member of the clutch may be the driving or driven part, and the clutch is applicable to other parts than pulleys. The details of construction may also be modified without departing from the principle of my invention, and I therefore do not wish to be understood as limiting myself to the precise structure hereinbefore described, and shown in the drawings.

Having thus fully described my invention, what I claim as new, and desire to secure by Letters Patent, is—

1. In a friction-clutch, the combination, with a member provided with an annular friction-surface, of a second member having radial slots or ways, clutch-shoes having pivots mounted in said slots or ways, centripetally-acting springs connected with said clutch-shoes, a longitudinally-movable collar rotating with said second member, and toggle-arms pivoted to said collar and to said shoes, substantially as described.

2. A friction-clutch comprising a member having an annular friction-surface, and a second member having radial slots or ways, clutch-shoes having pivots mounted in said slots or ways, centripetally-acting springs connected to said pivots, a longitudinally-sliding collar rotating with said second member, and toggle-arms pivoted to said collar and to the clutch-shoes eccentrically of the pivots of these latter, substantially as described.

3. A friction-clutch comprising a member having an annular friction-surface, and a second member consisting of a spider having radially-slotted arms, clutch-shoes having laterally-extending lugs provided with pivot-bolts passing through the slots of said arms, a collar longitudinally movable relatively to the axis of rotation of the clutch, toggle-arms pivoted to said collar and to the clutch-shoes eccentrically of the pivots of these latter, and centripetally-acting springs connecting the pivots of the clutch-shoes with the corresponding radial arms, substantially as described.

4. A friction-clutch comprising a shaft, a pulley secured thereon and having an internal friction-surface, a spider comprising radial arms and a hub loosely mounted on said shaft, a pinion also loosely mounted on said shaft and in engagement with the hub of the spider, clutch-shoes, each provided with lateral arms and a pivot-bolt connecting said arms, the corresponding spider-arm being radially slotted to receive said pivot-bolt, centripetally-acting springs connecting said pivot-bolts with the respective spider-arms, a collar longitudinally movable on the hub of the spider, and toggle-arms pivoted to said collar and to the clutch-shoes eccentrically of the pivots of these latter, substantially as described.

In testimony whereof I affix my signature in presence of two witnesses.

EDWARD HUBER.

Witnesses:
JOHN J. CRAWLEY,
SARA W. CUSIC.